March 11, 1924.
A. J. HARTLEY
SWINGING CONVEYER
Filed Feb. 3, 1919
1,486,519
5 Sheets-Sheet 1
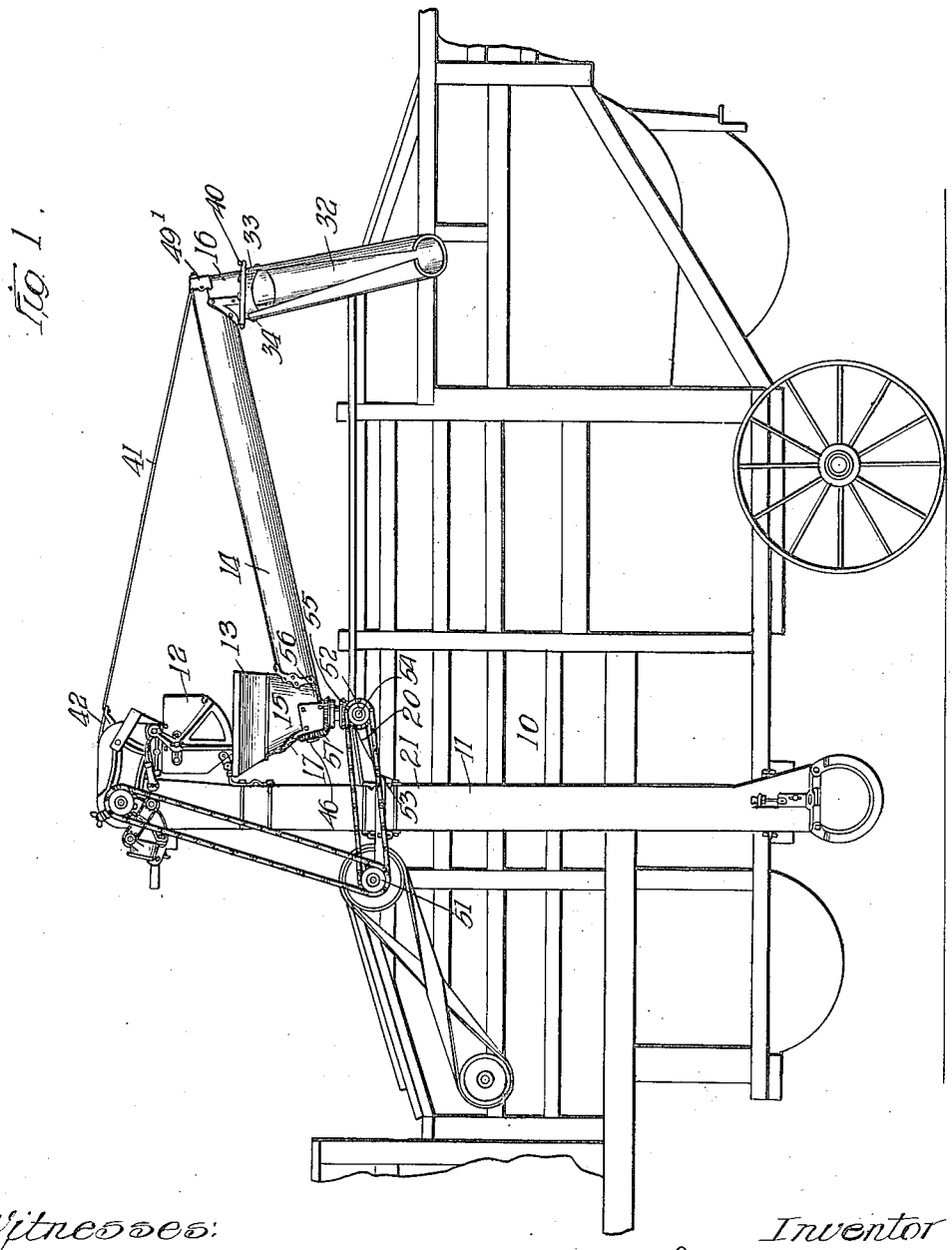

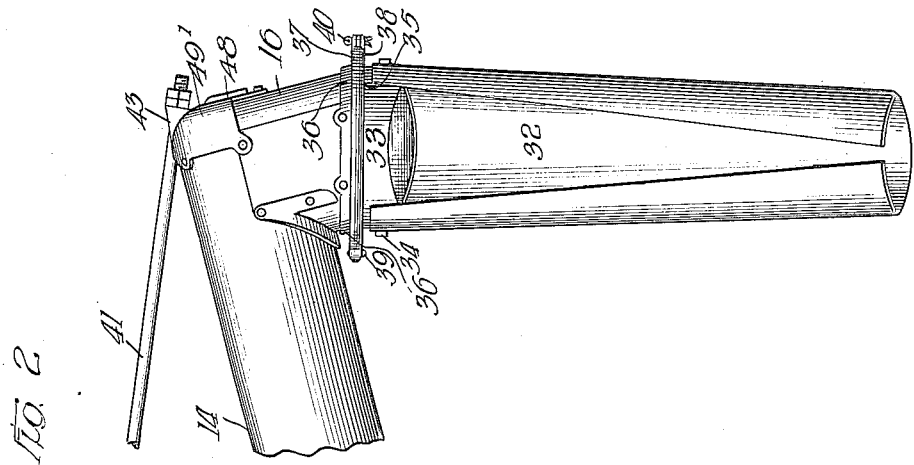
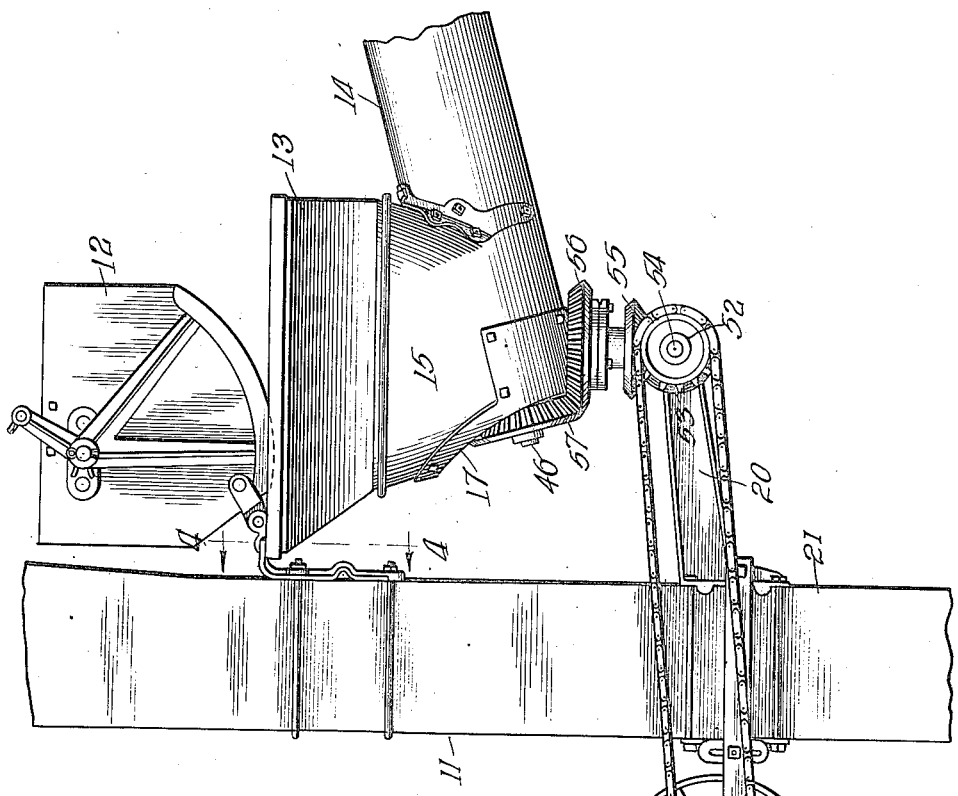

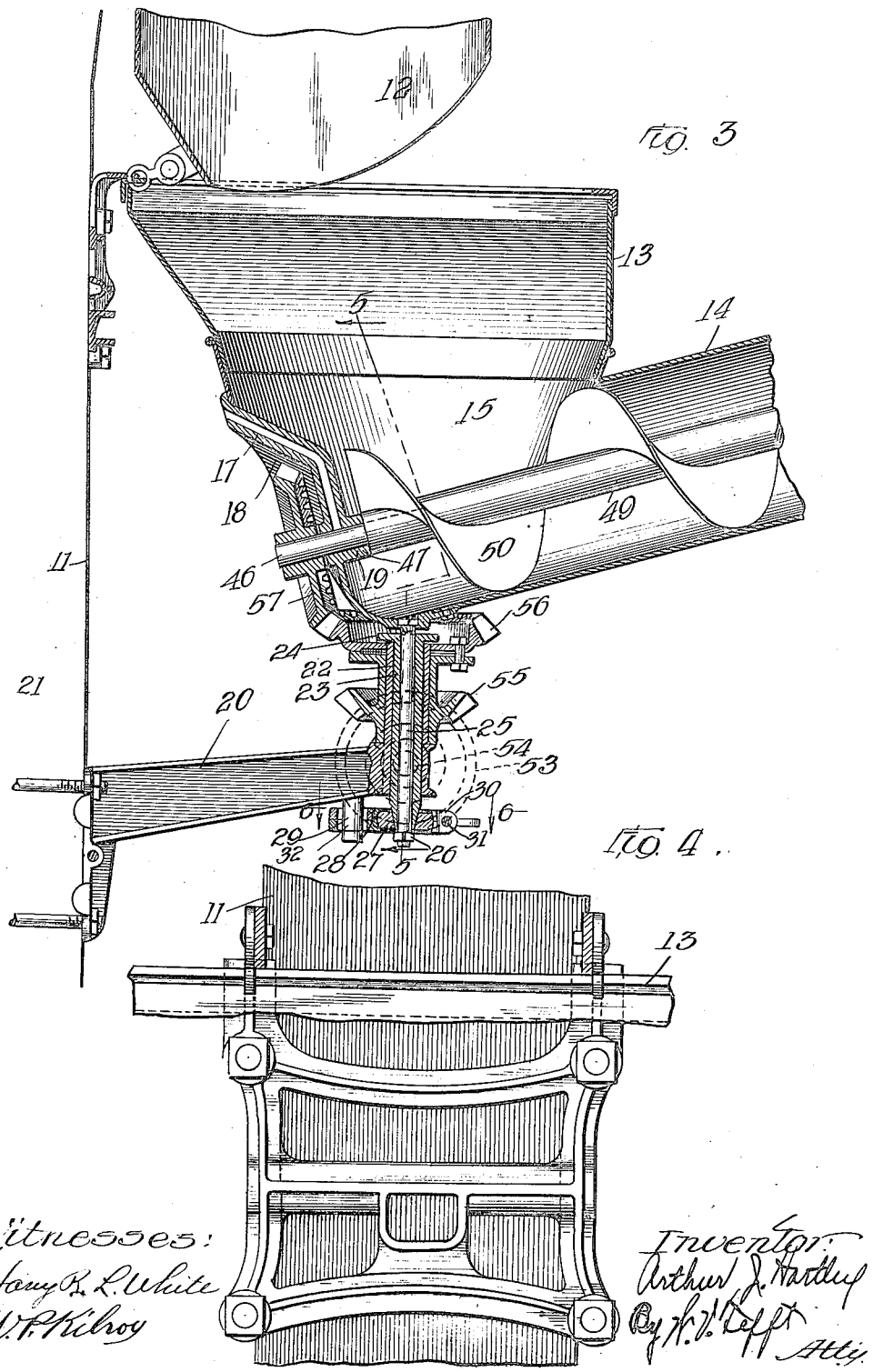

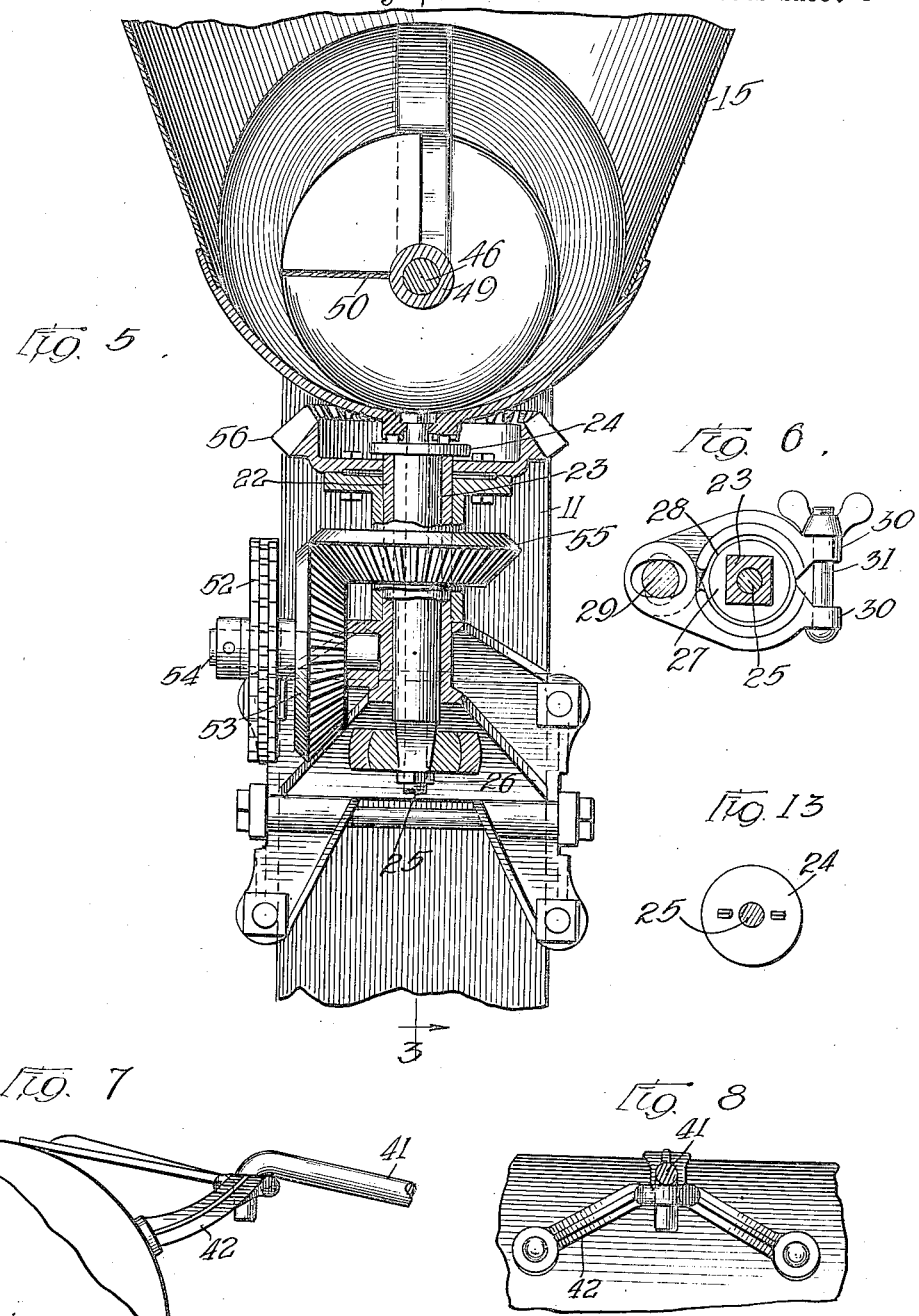

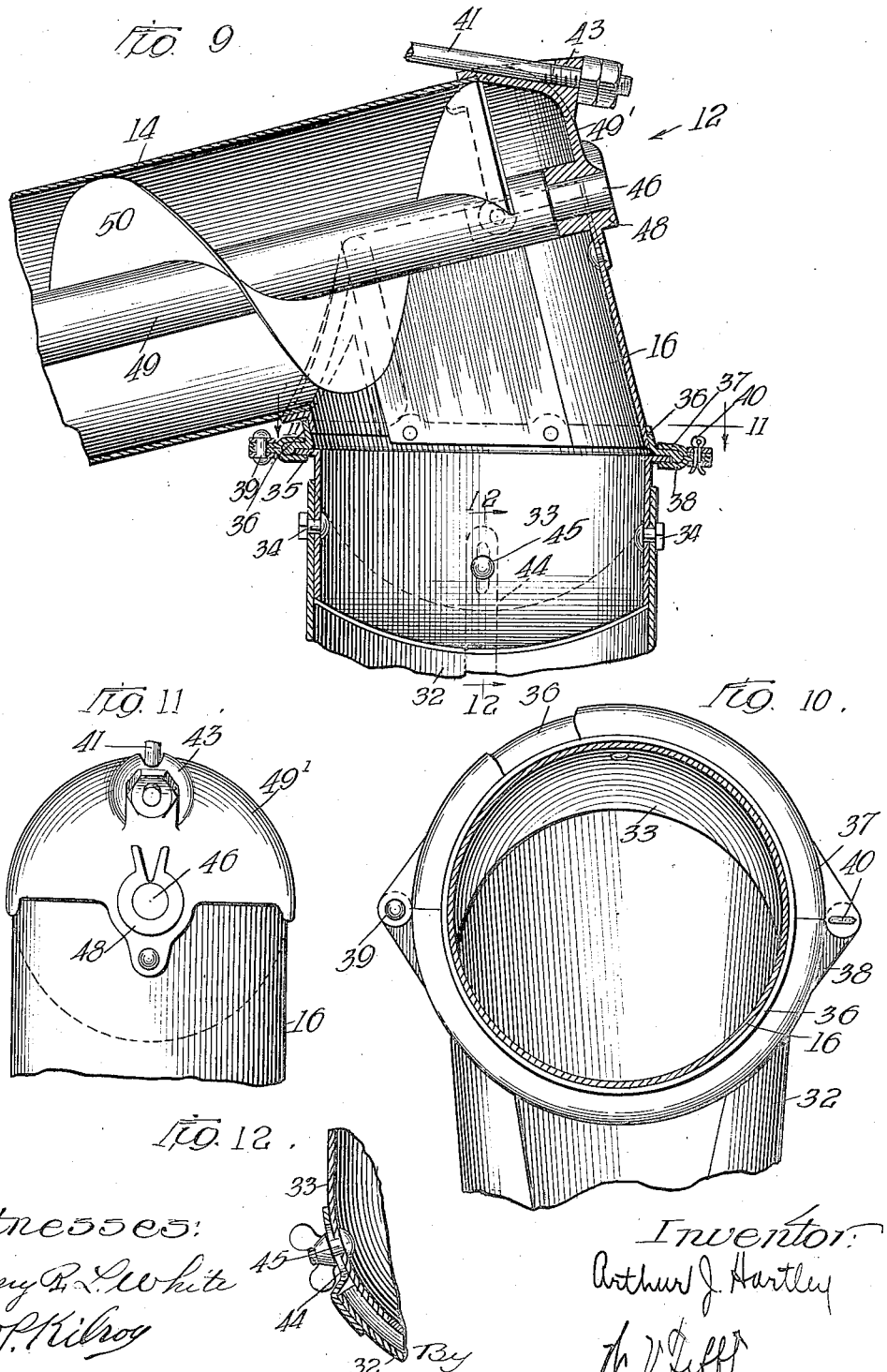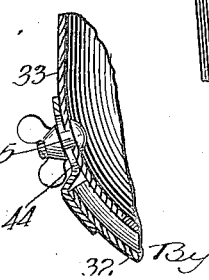

Patented Mar. 11, 1924.

1,486,519

UNITED STATES PATENT OFFICE.

ARTHUR J. HARTLEY, OF PEORIA, ILLINOIS, ASSIGNOR TO HART GRAIN WEIGHER CO., OF PEORIA, ILLINOIS, A CORPORATION OF ILLINOIS.

SWINGING CONVEYER.

Application filed February 3, 1919. Serial No. 274,762.

*To all whom it may concern:*

Be it known that I, ARTHUR J. HARTLEY, a citizen of the United States of America, residing at Peoria, in the county of Peoria and State of Illinois, have invented certain new and useful Improvements in Swinging Conveyers, of which the following is a specification.

My invention relates to swinging conveyers.

My invention has special reference to conveyers designed for operation in connection with grain weighers.

The purpose of my invention is to provide a conveyer comprising sections relatively adjustable, and the complete conveyer swingable under a brake tension.

My invention consists in the association of a conveyer with a weigher hopper of a grain weigher, and the relative association of sectional parts of the conveyer to facilitate relative adjustment between such parts, to render the same capable of delivering grain to wagons disposed in varying positions at either side of a threshing machine, and in the capability of the conveyer to distribute grain lengthwise of such wagons in their several positions.

My invention also includes an angular placement of the main reach of the conveyer from the horizontal, to effect attachment of its receiving end at a low point on the elevator stand of the grain weigher outfit, to the end that the height of such elevator stand may be materially lessened over what would be required if a swinging conveyer designed to swing across the deck of a threshing machine were disposed in a horizontal position.

My invention also includes details of construction and relative arrangement of parts hereinafter more particularly described.

Referring to the drawings—

Fig. 1 is a side elevation of my device, showing the manner of associating the same with a grain weigher, and also the manner of relating it to a threshing machine;

Fig. 2 is a side elevation, in enlargement, of similar elements to that of my device as shown in Fig. 1.

Fig. 3 is a vertical sectional view, showing detail parts of my device.

Fig. 4 is a detail view, showing the manner of connecting a hopper element to the elevator stand taken on 4—4 of Fig. 2.

Fig. 5 is a cross-sectional view on the line 5—5 of Fig. 3;

Fig. 6 is a detail view of a friction brake mechanism;

Fig. 7 is a detail view of a hanger or suspension element for the conveyer.

Fig. 8 is a view taken at right angles to the view of Fig. 7.

Fig. 9 is a vertical sectional view through the head end of the main section of the elevator;

Fig. 10 is a cross-sectional view on the line 11—11 of Fig. 9.

Fig. 11 is a detail view, at the head end of the main conveyer section, as shown in Fig. 9;

Fig. 12 is a detail view, showing a stop element at the receiving end of a spout member.

Fig. 13 is a detail view of parts indicating the manner of supporting the rear end of the main conveyer section.

The improvements herein applied have been developed as a result of applicant's years of experience in the designing and manufacture of grain weighers and auxiliary appliances therefor. The capability of the device here shown to perform the useful functions assigned it has been fully demonstrated by its application to practical use.

Loading wagons at the side of threshing machines has always been slow work, because of the fact that there was practically only one position on either side in which a wagon could be placed to effect convenient loading.

By the use of my device, I shorten the time of loading, and also save labor in the operation, because of the capability of relative buckling action between the pivoted main reach of the conveyer and a swivel spout member connected therewith. By proper approximate placing or swinging of the main reach of the conveyer, and then by moving by hand, the spout member, it may be caused to deliver grain practically on the center line throughout the length of a wagon bed. During such loading, of course, the two elements of the conveyer, that is, the main reach and the spout member, will be subject to relative movement, as will be readily understood.

By disposing the conveyer in the angular position shown, and supporting it in the manner disclosed, I am able to attached it to a comparatively low point on the elevator body, and still not interfere with its being swung across the deck of the threshing machine, and thereby I am able to decrease the height of the elevator stand.

Referring to the drawings, 10 indicates a threshing machine body; 11 is an elevator stand; 12 is a weigher hopper; 13 is a stationary hopper designed to receive and center a discharge from the weigher body. As none of the above disclosed parts is a part of my invention, I will not describe them further.

Referring now particularly to my cross conveyer, 14 is the main reach thereof, constructed in tubular form; 15 is a hopper member attached to tubular conveyer 14, and is adapted to receive the centered discharge from hopper 13. 16 is a head or discharge section connected with the outer end of tubular member 14. A cast closure member 17 is provided at the rear end of the tubular member, the same being inset as at 18, for the purpose of housing a gear and is provided with a bearing as 19, for receiving and supporting a shaft.

The conveyer is supported at the rear end of its main reach upon arm 20, suitably spaced from and connected with the elevator leg 21, said arm having connected therewith the upwardly extending sleeve member 22. 23 is, similarly, a sleeve member supported in main sleeve 22, and is expanded at its upper end into the head member 24. The rear end of the main reach of the conveyer is adapted to rest upon head member 24 or sleeve 23, and the parts are designed to be bolted together, by and through bolt 25, depending within and through sleeve 23, and is threaded, and a nut 26 is applied at its lower end. The lower end of sleeve member 23 is angularly fashioned and tapered to receive and support a friction brake member 27. 28 is a brake band member, comprising sections pivotally related to stud 29, depending from arm or reach 20, the relation of the brake band parts to said pin being such as to compensate for difference in size or contour of clutch member 27. The forward ends of brake members 28 have forwardly extending lug members 30, and are spaced apart relatively. 31 is a thumb screw adapted to be suitably supported and related to the lug portions of brake band members 28, that it may serve to tighten or loosen said band relative to clutch member 27, thereby effecting a brake upon the movement of said brake member 27. A chute, or discharge spout 32, is designed to be connected with the head or discharge section 16 thereof. The parts included in such connection are a short chute member 33, to which the said spout is pivoted, as at 34, and which is flanged at its upper end, as at 35; a flanged band, as 36, is attached to the lower end of head member 16, and a pair of ring members 37, 38, formed respectively, so that when they are united, they form a groove or channelway, adapted to embrace flange 35 on chute 33, and a flange part of band 36, whereby a swivel, jointed connection between head member 16 and short chute 33 is established.

Ring members 37, 38, respectively, may be made in section, as shown and pivotally united by a common pivot, as 39, and may be connected at their forward ends by means of a pin as 40. The conveyer is designed to be supported from the head of the elevator stand by means of a reach or rod 41, its rear end connecting with a bracket member 42, attached to said head, as shown in Figures 7 and 8, and at its forward end to the head portion of the main reach 14 of the conveyer by the means, and in the manner shown in Fig. 9, wherein said head is carried within a way or opening in a lug member 43, on said head, and is held therein by means of nut members as shown on the threaded end of said rod or reach.

Chute member 32 is designed to be related to the short chute 33 in such a manner that it may be raised and lowered within certain limits. To define the limit of its lowering movement, I have provided the stop member 44, fixed to the rear wall of the short chute member 33, the same being connected with said short chute member, by means of bolt and thumb nut 45, as shown in Fig. 12.

To facilitate moving grain discharged to the conveyer, I have provided an auger conveyer, comprising a shaft 46, supported at the rear end of the main reach 14, of the tubular conveyer member, in the bearing 47 on cast member 18, and at its forward end in bearing 48 of the cast part 49' of the head member of said main tubular reach 14. Also, a sleeve member 49, fixed to shaft 46, there being disposed on said sleeve, the auger member 50.

The particular means for driving the auger member, include the driving connection, or member 51 of the threshing machine, to member 52, connected to drive bevel gear 53, both of such members being supported upon stub shaft or pin 54, supported and fixed in connection with sleeve member 22. Bevel gear member 53 drives gear member 55, supported in connection with sleeve member 22, and it, in turn, is connected through a hub extension and by proper attaching means, to bevel gear 56, similarly supported in connection with sleeve 22, which said gear, in turn, meshes with gear 57, fixed to the rear end of auger shaft 46, whereby when power is applied, and the several connected parts operated, the auger will be caused to be turned in the proper direction to advance grain through tubular member 14, to be discharged from its forward end into short chute 33, and from thence to spout 32.

The parts of my device, as herein shown and related, constitute a conveyer structure which is capable of receiving grain discharged from a grain weigher device, and to suitably convey same for discharge into wagons, also the conveyer structure, as a whole, is capable of being turned about a center approximating a line through the center of receiving hopper 13, to position the conveyer conveniently for discharge into waiting wagons either upon the one side of the threshing machine or the other.

I am aware that heretofore conveyers have been provided, which were adapted to swing to different positions, and to discharge grain to waiting wagons, or the like. However, I am not aware of any conveyer in connection with which there was provided a swiveled spout that served not only to extend the reach for delivery, but also to render the members of the complete conveying element relatively adjustable to accommodate the distribution of grain from one end of the wagon to the other, and to the extent of relating the parts that this function may be practically and conveniently carried out, I have contributed to the practical art of grain conveying appliances.

As previously noted, the conveyer is designed to deliver grain at either side of a threshing machine. I am aware that horizontally disposed swinging conveyers have heretofore been provided for the purpose. However, so far as I am aware, no swinging, inclined conveyer has heretofore been patented or used, and so far as this applicant knows all such conveyers were positioned relatively at right angles to the threshing machine deck, that is, were positioned horizontally, therefore requiring attachment to or from the elevator stand, at a point above the threshing machine deck. Many apparent advantages result from reducing the height of the elevator stand, which are not necessary to be explained here. I have inclined my elevator, as shown, with a view of accomplishing a lower positioning of the receiving end of the conveyer, to the end that the elevator stand may be shortened in height, and in the practical application of the device, I have found that very substantial and beneficial results attend.

I have shown herein the manner of constructing and arranging the parts of my device, that to my mind, best serves to accomplish the result, sought to be obtained, and I have shown the device as having a special application to a grain weigher. However, the device may be differently constructed, and it may have a wider application than that represented by the present disclosure. Furthermore, it is not my purpose to define its limits in the specification hereinbefore detailed, but desire that it shall cover all devices in principle the same, and structures as hereinafter specially claimed.

What I claim is:

1. In a swinging conveyer, in combination, a conveyer reach, comprising an inclined tubular member provided with a hopper at its receiving end and a head-member at its discharge end, conveyer means in the tubular member, means for driving the conveyer means, means for supporting the tubular member at its receiving end in a pivotal manner means for supporting the outer end of the tubular member including a rod, its outer end connected with the tubular member and its rear end suitably supported and pivotally centered in line with and above the pivot member for the receiving end of the tubular member, a chute swivelly connected to the head-member of the tubular member, and a spout pivotally connected to the chute member.

2. In a swinging conveyer, in combination, a delivery reach comprising vertically inclined tubular member provided with a hopper element at its receiving end, and with a head member at its discharge end, a short chute member swivelly connected to the head part of the tubular member, a spout pivotally connected to said short chute in a relation to permit the said spout to be raised and lowered within defined limits, means for supporting the receiving end of the tubular member in a pivotal manner, means for supporting the tubular member from its discharge end in a manner to permit the tubular member to swing across the deck of a threshing machine, conveying means within the tubular member, and means for operating the same.

3. In a device of the class described, in combination, a support, a pivoting pin therein, a conveyer reach, means for relating the receiving end of the conveyer reach with said pivoting pin to facilitate an interlock and relative adjustment therebetween, including in connection with said pin and said reach of a head and a seat whereby the pin will be turned with the movement of the conveyer reach and related interengaging lug members respectively on the head and the reach member, means for holding said related members in desired relative adjustment, means for tensioning the movement of the pivoting pin, supporting and adjusting means for the conveyer reach related thereto in a manner to permit its free swinging about its pivotal support and for vertical adjustment thereof, a supplemental reach member, means for relating the supplemental reach to the main reach in a manner to permit to be turned horizontally about the discharge way from said main reach, and for limited vertical movement with relation to said main reach and means including a rod, one end attached to the discharge end of the conveyer reach and the other end suitably supported in a pivotal manner above the pivotal support of the receiving end of the conveyer reach and in centered relation therewith.

4. In combination with a threshing machine, a vertically disposed elevating member, a support, a vertically inclined conveyer member pivotally and rockably supported upon the supporting member and provided with a hopper at its receiving end, and a head member at its discharge end, conveying means in the conveyer member, means for driving the same, means for supporting the outer end of the conveyer to permit its being rocked vertically, a chute member swivelly connected with the head member of the conveyer, and a spout pivotally connected with the chute member.

5. In a device of the class described, in combination, an elevator stand connected with a threshing machine body and extending above the top of the deck of the latter, a weighing device associated with the discharge end of said elevator stand, a grain receiving member, including a tubular section and associated boot and discharge members, a conveyer element within the tubular member, means for supporting the receiving end of the grain receiving member in a pivotal, laterally swingable, manner, means for driving the conveyer member, means for supporting the outer end of the conveyer in a manner to permit it to swing across the deck of the threshing machine for discharge at the opposed side from that at which the elevator stand is located. a spout member swivelly related to the discharge end of the tubular conveyer housing, a chute pivoted to and vertically swingable with relation to said spout member.

6. In a device of the class described, in combination with a threshing machine and an associated elevator stand and weighing element of adjustable and flexible means for conveying grain to an indefinite number of points within substantially a complete circle about the elevator stand, including a conveyer housing fashioned to receive grain from the weigher element, a conveyer element within said housing, means for pivotally supporting the conveyer housing in an inclined position and at the lowest possible point with respect to the deck of the threshing machine to permit it to swing across said deck to facilitate delivery of grain at the opposite side from that to which the elevator stand is located, and including in such support a rod member attached to the outer end of the conveyer housing and pivotally connected with the support above and in centered relation with the pivotal support of the rear end of the conveyer housing, a spout member swivelly related to the discharge end of the conveyer housing, a chute pivoted to and vertically swingable with relation to said spout member.

In testimony whereof I have affixed my signature.

ARTHUR J. HARTLEY.